March 13, 1945.  H. LORANT  2,371,304
APPARATUS FOR FORMING CUP-SHAPED HOLLOW BODIES
Filed Jan. 30, 1943   3 Sheets-Sheet 1

INVENTOR
HUGO LORANT
BY
ATTORNEYS

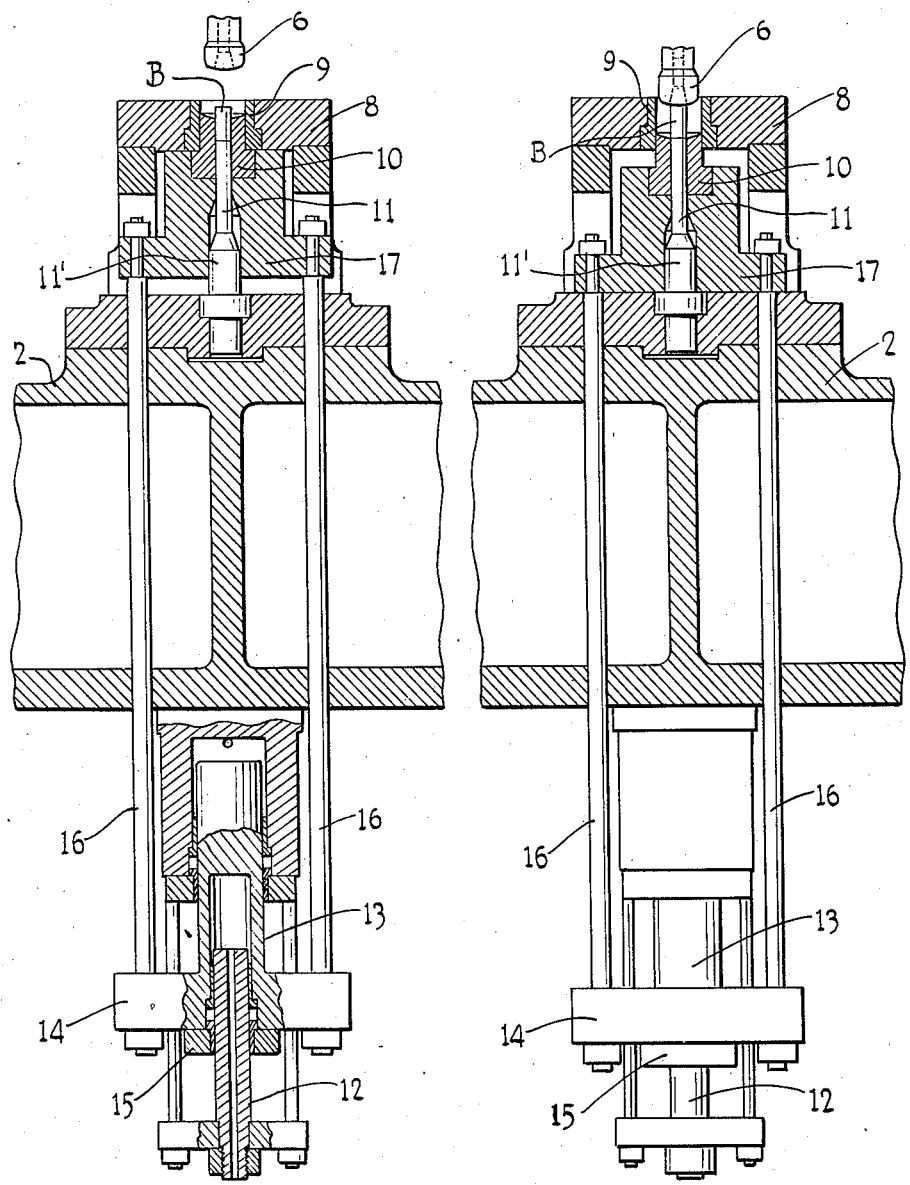

March 13, 1945.  H. LORANT  2,371,304
APPARATUS FOR FORMING CUP-SHAPED HOLLOW BODIES
Filed Jan. 30, 1943  3 Sheets-Sheet 3

INVENTOR
HUGO LORANT
BY
Hammond & Littell
ATTORNEYS

Patented Mar. 13, 1945

2,371,304

UNITED STATES PATENT OFFICE 2,371,304

APPARATUS FOR FORMING CUP-SHAPED HOLLOW BODIES

Hugo Lorant, New York, N. Y., assignor to The Loewy Engineering Company Limited, London W.C.2, England, a corporation of Great Britain Application January 30, 1943, Serial No. 474,162
In Great Britain January 31, 1942

11 Claims. (Cl. 207—6)

The invention relates to presses for the manufacture of cup-shaped hollow bodies from solid billets and is particularly applicable to presses for making blanks from which cartridge cases are formed by subsequent drawing and other forming operations.

Heretofore, it was usual to make these hollow bodies and the blanks for cartridge cases from disc-shaped slugs which were of substantially the same diameter or outer contour as the hollow bodies or blanks into which the slugs were to be transformed by the cupping operation.

It has now been found that it is more advantageous in many respects to use for that purpose billets which are of substantially smaller diameter or outer contour than the cupped blanks, the necessary billet weight being obtained by a corresponding increase of height over that of the slugs, used heretofore.

One of the principal advantages of small diameter billets is that less power is required for the cupping operation. Another advantage is that all portions of the billet will be worked through when the billet is cupped with the result, that the cupped blanks will have a much more homogeneous grain structure, including the material at its bottom which heretofore was not subjected to any appreciable forging or kneading effects. The improvement of the grain structure is of particular importance as it facilitates the further working of the cups and improves also their quality. Another distinct advantage of using small diameter billets of greater height is that those billets can be readily obtained by casting or extrusion processes and are therefore much cheaper to produce than the large diameter slugs which had to be stamped or cut from expensive rolled strip, and this at very considerable loss of that costly material.

The cupping presses of known design were, however, not suitable for being fed with billets of small diameter, since those billets would have considerable radial clearance inside the die bore, if charged into those presses, and since the known presses were not provided with means for centering such a billet in the die and with respect to the piercing punch. Without being properly centered, the billets were liable to be placed in the die out of axial alignment with the punch, with the consequence that the subsequent piercing operation could result in cupped blanks, having sidewalls of unequal thickness or being otherwise faulty.

The present invention has for its main object to provide a press for making cup-shaped hollow bodies which is equipped with billet centering means inside the die bore, so that the press can effectively operate on billets of substantially smaller diameter or cross section than the die bore.

A further object of the invention is to provide a cupping press with billet centering means which will automatically become effective as soon as a billet is charged into the die bore of the press.

Another object of the invention is to provide a cupping press with billet centering means of very simple design, the means being mainly composed of the conventional parts of the press which are suitably shaped and arranged for this special purpose so that the centering means do not require any extra space inside or above the die and can be incorporated also without great difficulties in existing presses.

A still further object of the invention is to provide a cupping press with billet centering means which can be operated in conjunction with other press parts and the controls of which are interconnected with those of the other press parts so as to obtain any desired timing of their respective operations.

A still further feature of the invention is to provide a cupping press with billet centering means which can also be used for removing a cupped blank from the die-bore, should it stick to it after the piercing operation so that the ejector mechanism of known presses can be dispensed with.

The press according to the invention is particularly adapted for being fed with billets of small diameter and greater height such that they can be readily and inexpensively made by casting or extrusion processes.

According to one embodiment of the invention, the bottom piece of the press die consists of at least two concentric parts, of which the outlying one has the form of a sleeve or segments of a sleeve, fitting closely round the inner or center piece, and is adapted to be raised above the center piece, so as to form inside the die bore a receptacle which can hold a billet without any substantial radial clearance, it being understood that for this purpose the interior diameter of the sleeve bore is substantially the same as that of the billets which are to be fed to the press and that the sleeve is of sufficient length so that a billet is securely guided when the sleeve is in its elevated position.

In this way, means are provided inside the die bore of a cupping press which will cause a billet to be exactly centered inside that bore and thus also with respect to the shaping punch and which will automatically come into operation when a billet is being charged into the die.

After a billet has been charged and properly centered, the sleeve or centering means is lowered again to the bottom of the die bore in readiness for the cupping operation. In order to prevent a billet from toppling over or from coming out of axial alignment through any other cause during the time that the centering sleeve is retracted before the actual shaping operation, the punch can be lowered so far that it will be just above the billet or rest on it with light pressure without deforming the billet.

After a billet has been cupped, the sleeve will be raised again to form the centering receptacle for another billet before the next shaping operation. Through this movement of the sleeve any blank, which, after having been cupped, may adhere to the die, will be ejected therefrom in a firm manner. In this way the centering sleeve will also perform the function of the conventional ejecting mechanism which heretofore had to be provided in the known types of presses.

The center piece is preferably stationary and fixedly mounted on the base of the press, whereas the movable sleeve is supported on a bolster plate which will rest firmly on the top of the press base when the sleeve is in its lowermost position as is the case during the cupping operation.

In the case of hydraulic presses it is preferred to use hydraulic means for moving the centering sleeve, which means can be arranged below the press base and connected to the sleeve or its bolster by means of rods which are passed through openings in the press base. The connection between the rods and the sleeve or bolster is preferably detachable so that the die part can be easily interchanged and replaced.

The proper timing of the die sleeve movements with respect to those of the press punch can be achieved in the case of hydraulic operation by suitably interconnecting and interlocking their respective controls.

In its simplest form the movable die-sleeve will have circular cross-section so as to match billets of the same contour. It is, however, to be understood that the invention is not limited to a specific form of sleeve. For instance, the aperture of the sleeve can be of square or any other contour to match that of the billets.

Furthermore, the sleeve can consist of a plurality of spaced-apart segments, instead of one ring shaped piece, with fixed or movable segments in between, the latter being of different diameter and separately operable from the first segments so that one die will be fitted with two sets of centering means which can be alternately used with billets of different diameter. The same result could also be obtained by providing a plurality of concentric sleeves, which can be lifted and lowered independently of each other.

The top of the sleeve, together with that of the center piece, can have any desired configuration on its surface and can be formed there with recesses, shoulders, ribs, etc., so as to conform with the design of the cupped blank.

One embodiment of the invention will now be described more in detail by way of example.

In the accompanying drawings:

Figures 2, 3, 4 and 5 are sectional part elevations of the same press, in different stages of its operation.

Figure 1:
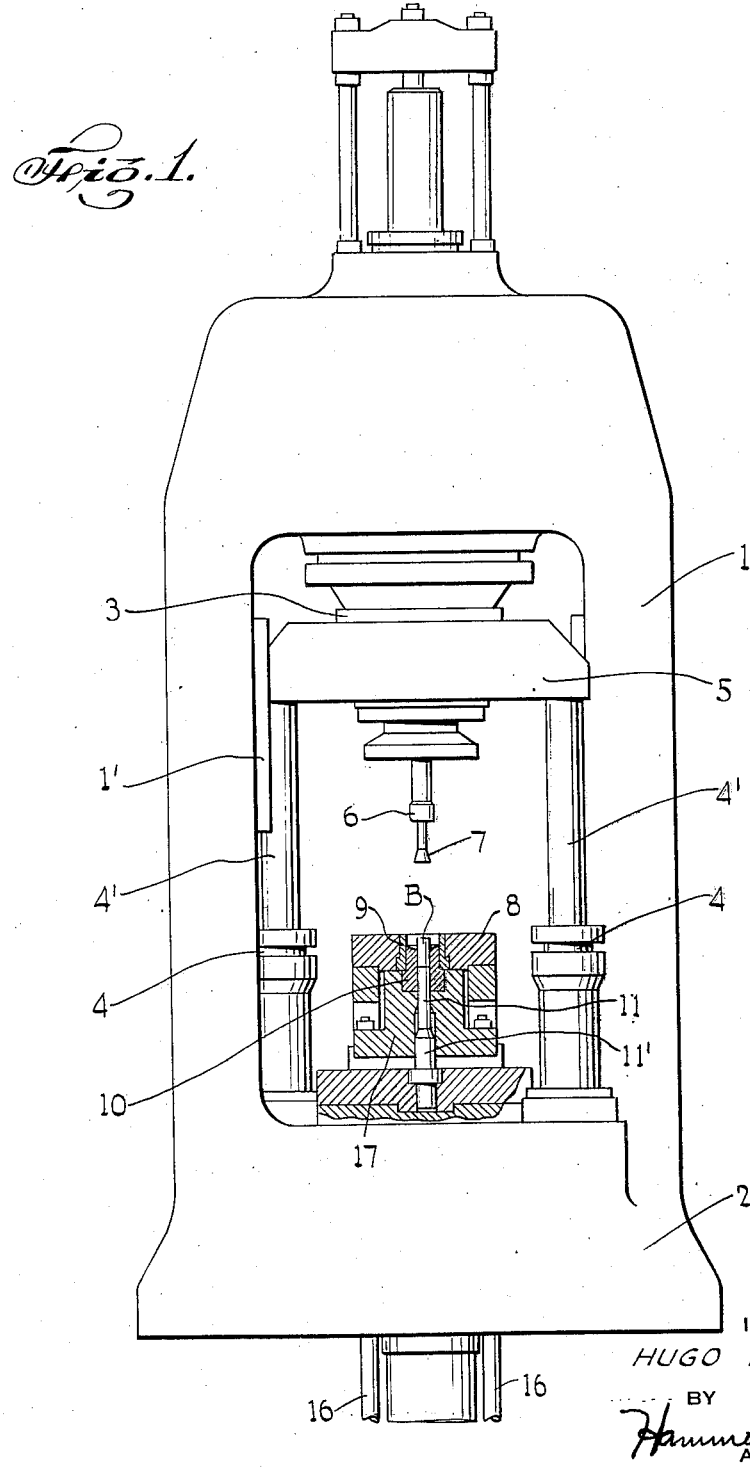
Figure 1 is an elevation, partly in section, of a cupping press, according to the invention.

In the drawings, 1 is the frame of a cupping press and 2 its base, which can be of one piece with the frame. The press illustrated is of the hydraulic type, having a main ram 3 and return rams 4 on both sides with extension rods 4' by means of which a tool carrying crosshead 5 can be lowered and lifted respectively in guideways 1' in the frame. Detachably mounted on the crosshead 5 is a punch 6, with a stripper-pin 7 which can be retracted into an axial bore of said punch.

The die of the press which receives the billets B consists of a die block 8, with a liner 9 (Figure 2) for the die bore. According to the invention the bottom of the die is constituted of two concentric parts, a sleeve 10 and a center piece 11. The sleeve 10 fits closely around the center piece and is adapted to be raised above the same so as to form inside the die bore a receptacle which can just hold one billet B without any substantial radial clearance (Figures 1 and 2). It is to be understood that for this purpose, the interior diameter of the sleeve 10 is substantially the same as that of the billets B which are fed to the press.

It is evident from the foregoing that by providing such a receptacle inside the die bore which can just hold a billet and which itself is in exact axial alignment with the punch, any billets charged into the press die will be efficiently centered with respect to the punch.

After a billet has been properly centered, the sleeve 10 is lowered again to the bottom of the die bore, so that its top surface will be adjacent to that of the center piece 11 (Figure 3). The die parts are then ready for the piercing and cupping operation. In order to prevent the billet B from toppling over or becoming displaced while the sleeve 10 is withdrawn, the punch 6 is brought to bear with slight pressure on the top of the billet B, without deforming it, however.

Figure 4:
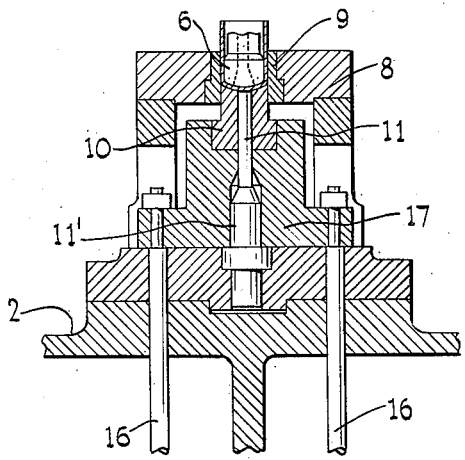

Figure 4 shows the position of the various tool parts after the cupping operation. It will be seen that the retracted sleeve 10 and the center piece 11 will both form a continuous surface at the bottom of the die-bore on which the bottom of the cupped blank is shaped in the same manner as in one-piece dies of conventional design. This surface is shown in the example illustrated as being of dome-shape; it is, however, to be understood that it can also be provided with recesses, ribs, shoulders, grooves, etc. to suit any desired configuration of the blank bottom.

Figure 5:
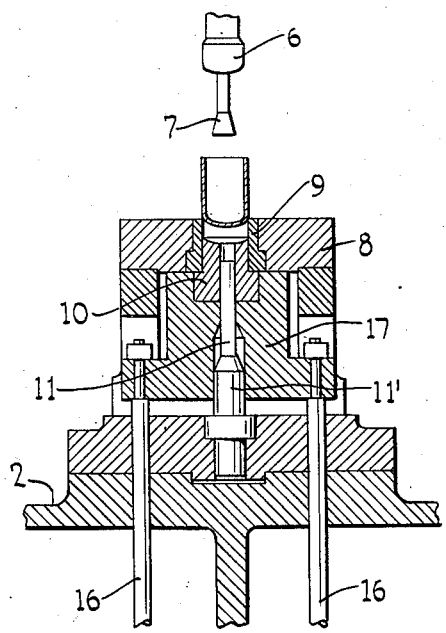

In Figure 5, punch 6 has been withdrawn from the die, and the cupped blank stripped from the punch by the stripper pin 7 which, by means not shown here, has been pushed out of the punch 6. The sleeve 10 is raised again to be in readiness for receiving a billet B for the next cupping operation.

Should, for any reason, the cupped blank adhere to the die, after the punch has been withdrawn, so as to make the stripper pin 7 ineffective, the blank will be ejected from the die through the lift of the sleeve 10. In this case the sleeve 10 will then also perform the function of an ejector device so that any special means for that purpose can be dispensed with.

The center piece 11 is fixed to the base 2 of the press by means of a downward extension 11'.

The means for moving the sleeve 10 are arranged below the base 2 and comprise two hydraulic rams 12 and 13, a crosshead 14 and a double cylinder 15, cooperating with the two rams. The crosshead is attached to the cylinder and can be moved in opposite directions by means of the above arrangement. Rods 16 are attached to the crosshead which, passing through apertures in the base 2, connect a bolster 17 on which the sleeve 10 is supported to the crosshead 14. The bolster 17 is arranged in a suitable recess in the die-block 8 and will be raised and lowered together with the sleeve 10 by means of the hydraulic drive 12—15. As shown in Figures 3 and 4 the bolster 17 will firmly rest on the base 2 of the press in its lowermost position so that the pressure exerted on the sleeve during the cupping operation will be directly transmitted to the press frame, whilst the connecting rods 16 and the hydraulic drive 12—15 are entirely relieved from that pressure.

In order to simplify the operation of the centering means and also to prevent any faulty operation, the control means for the hydraulic drive, which are not shown here, can be interconnected or interlocked with the control for the press punch 6 or other parts of the press.

Both the sleeve 10 and the center piece 11 are so mounted in the press that they can easily be detached from it, for replacement. The means, provided for that end, are not shown here, as they will present themselves without any difficulties to those skilled in the art.

As indicated above, various modifications and changes may be made within my invention and parts may be reversed in their operation without departing from the spirit of my invention or the scope of the claims.

I claim:

1. In a press for making cup-shaped hollow bodies, a supporting base, a punch arranged above and operable towards and away from said base, a die-block mounted on said base, having an aperture for receiving a billet to be operated upon by said punch, and a composite centering member, forming the bottom of said die-aperture, said member consisting of an outer member coaxial with said punch, and an inner member inside said outer member, said outer member being normally at the same level with said inner member, and means to raise said outer member temporarily above said level so as to act as a centering means for a billet charged into the die-aperture.

2. In a press for making cup-shaped hollow bodies, a supporting base, a punch arranged above and operable towards and away from said base, a die-block mounted on said base, having an aperture for receiving a billet to be operated upon by said punch, and a composite centering member, forming the bottom of said die-aperture, said member consisting of an outer member coaxial with said punch, and an inner member inside said outer member, said outer member being concentric with said inner member and said outer member being normally at the same level with said inner member, and means to raise said outer member temporarily above said level so as to act as a centering means for a billet charged into the die-aperture.

3. In a press for making cup-shaped hollow bodies, a supporting base, a punch arranged above and operable towards and away from said base, a die-block mounted on said base, having an aperture for receiving a billet to be operated upon by said punch, and a composite closure member, forming the bottom of said die-aperture, said member consisting of a hollow outer piece, having its bore coaxial with said punch, and a center piece inside said hollow outer piece, said hollow outer piece being normally at the same level with said center piece, and means to raise said hollow outer piece temporarily above said level so as to act as a centering means for a billet charged into the die-aperture.

4. In a press for making cup-shaped hollow bodies, a supporting base, a punch arranged above and operable towards and away from said base, a die-block on said base, having an aperture for receiving a billet to be converted into a cup-shaped hollow body by means of said punch and through the process of inverted extrusion, a composite closure member at the bottom of said die-aperture, said member consisting of an outer piece in the shape of a sleeve axially aligned with said punch, and an inner piece fitting into said sleeve, said sleeve being normally at one level with said inner piece, but adapted to be lifted into a position in which it will form a guide for centering with respect to said punch a billet charged into said die-block, and means arranged below said base for lifting and lowering said sleeve.

5. In a press for making cup-shaped hollow bodies, a supporting base, a punch arranged above and operable towards and away from said base, a die-block on said base, having an aperture for receiving a billet to be converted into a cup-shaped hollow body by means of said punch and through the process of inverted extrusion, a composite closure member at the bottom of said die-aperture, said member consisting of an outer member axially aligned with said punch, and an inner member fitting into said outer member, said outer and said inner member being normally at one level but adapted to be moved relative to each other into a position in which they will form a guide for centering with respect to said punch a billet charged into said die-block, and means, arranged below said base, for moving said outer and said inner member relative to each other.

6. In a press for making cup-shaped hollow bodies, a supporting base, a punch arranged above and operable towards and away from said base, a die-block on said base, having an aperture for receiving a billet to be converted into a cup-shaped hollow body by means of said punch and through the process of inverted extrusion, a composite closure member at the bottom of said die-aperture, said member consisting of an outer piece in the shape of a sleeve axially aligned with said punch, and an inner piece fitting into said sleeve, said sleeve and said inner piece being normally at one level but adapted to be moved relative to each other into a position in which they will form a guide for centering with respect to said punch a billet charged into said die-block, and means, arranged below said base, for moving said sleeve and said inner piece relative to each other.

7. In a press for making cup-shaped hollow bodies, a supporting base, a punch arranged above and operable towards and away from said base, a die-block on said base, having an aperture for receiving a billet to be converted into a cup-shaped hollow body by means of said punch and through the process of inverted extrusion, a composite closure member at the bottom of said die aperture, said member consisting of an outer piece in the shape of a sleeve, axially aligned with said punch, and an inner piece fitting into said sleeve, said sleeve being normally at one level with said inner piece, but adapted to be lifted into a position above said inner piece, but inside said die-aperture so as to form a guiding and centering ring for a billet charged into said aperture, a bolster plate carrying said sleeve, means for anchoring said inner piece to said base, and means for lifting and lowering said sleeve.

8. In a press for making cup-shaped hollow bodies, a supporting base, a punch arranged above and operable towards and away from said base, a die-block on said base, having an aperture for receiving a billet to be converted into a cup-shaped hollow body by means of said punch through the process of inverted extrusion, a composite closure member at the bottom of said die-aperture, said member consisting of an outer piece in the shape of a sleeve, axially aligned with said punch, and an inner piece fitting into said sleeve, said sleeve being normally at one level with said inner piece, but adapted to be lifted into a position above said inner piece, but inside said aperture so as to form a guiding and centering ring for a billet charged into said aperture, a bolster plate carrying said sleeve, means for anchoring said inner piece to said base, means for lifting and lowering said sleeve, and a detachable connection between said bolster plate and said lifting and lowering means.

9. In a press for making cup-shaped hollow bodies by inverted extrusion, a supporting base, a punch arranged above and operable towards and away from said base, a die-block on said base, having an aperture for receiving a billet to be operated upon by said punch, a receptacle at the bottom of said die-aperture adapted to hold a billet in axial alignment with said punch, the outer wall of said receptacle being formed as a separate piece from its bottom and means to retract said outer wall to the level of the bottom of said receptacle to form part of the die-bottom during the extrusion operation.

10. In a press for making cup-shaped hollow bodies by inverted extrusion, a supporting base, a punch arranged above and operable towards and away from said base, a die-block on said base, having an aperture for receiving a billet to be operated upon by said punch, a receptacle at the bottom of said die-aperture adapted to hold a billet in axial alignment with said punch, the outer portion of said receptacle being movable relative to the inner portion, and means to move said portions relative to each other so as to cause them to form part of the die-bottom during the extrusion operation.

11. In a press for making cup-shaped hollow bodies, a supporting base, a punch arranged above and operable towards and away from said base, a die-block on said base, having an aperture for receiving a billet to be converted into a cup-shaped hollow body by means of said punch and through the process of inverted extrusion, a composite closure member at the bottom of said aperture, consisting of an outer piece in the shape of a sleeve and an inner piece, fitting closely into said sleeve, and means to move said sleeve upwardly relative to said inner piece inside the die-aperture for the purposes of serving as a centering means for a billet charged into said die-block prior to its extrusion and as an ejector for the cupped article after the extrusion.

HUGO LORANT.